US010611470B2

(12) United States Patent
Wilson (10) Patent No.: US 10,611,470 B2
(45) Date of Patent: *Apr. 7, 2020

(54) DRIVE SYSTEM FOR AIRCRAFT LANDING GEAR (71) Applicant: AIRBUS OPERATIONS LIMITED, Bristol (GB)

(72) Inventor: Fraser Wilson, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/230,230

(22) Filed: Dec. 21, 2018

(65) Prior Publication Data

US 2019/0135417 A1    May 9, 2019

Related U.S. Application Data (63) Continuation of application No. 15/118,791, filed as application No. PCT/GB2015/050413 on Feb. 13, 2015, now Pat. No. 10,196,134.

(30) Foreign Application Priority Data

Feb. 13, 2014 (GB) .................................. 1402501.9
Feb. 13, 2014 (GB) .................................. 1402518.3

(51) Int. Cl.
*B64C 25/40* (2006.01)
*F16H 55/10* (2006.01)
(Continued)

(52) U.S. Cl.
CPC ............ *B64C 25/405* (2013.01); *B64C 25/34* (2013.01); *F16H 1/20* (2013.01); *F16H 55/10* (2013.01);
(Continued)

(58) Field of Classification Search
CPC ....... B64C 25/405; B64C 25/36; B64C 25/40; Y02T 50/823; F16H 1/20; F16H 2035/003; F16H 2057/0012
(Continued)

(56) References Cited

U.S. PATENT DOCUMENTS 3,977,631 A    8/1976    Jenny
2009/0294577 A1    12/2009    Roques et al.
(Continued)

FOREIGN PATENT DOCUMENTS

EP    2527249    11/2012
EP    2639160    9/2013
(Continued)

OTHER PUBLICATIONS

Hiroshi Honda and Hiroshi Makino, "Research on the Trochoidal Gears (1st Report): Classification and Basic Formulas of the Trochoidal Gears", Translation of Journal of the Japan Society for Precision Engineering, 1994, vol. 60, No. 7, p. 949-953.
(Continued)

*Primary Examiner* — Christopher P Ellis
(74) *Attorney, Agent, or Firm* — Nixon & Vanderhye P.C.

(57) ABSTRACT

A drive system for rotating a wheel of an aircraft landing gear is disclosed including a motor operable to rotate a drive pinion via a drive path; and a driven gear adapted to be attached to the wheel so as to be capable of rotating the wheel. The drive system has a drive configuration in which the drive pinion is capable of meshing with the driven gear to permit the motor to drive the driven gear via the drive path. The drive path comprises a first compensating gear mounted on a common drive shaft with the drive pinion so as to be capable of rotating in tandem with the drive pinion, and a second compensating gear which is meshed with the first compensating gear. One of the drive pinion and the
(Continued)

driven gear comprises a roller gear having a series of rollers arranged to form a ring, each roller being rotatable about a roller axis, and the other of the dive pinion and the driven gear comprises a sprocket.

18 Claims, 12 Drawing Sheets

(51) Int. Cl.
| | |
|---|---|
| *F16H 57/00* | (2012.01) |
| *B64C 25/34* | (2006.01) |
| *F16H 1/20* | (2006.01) |
| *F16H 55/30* | (2006.01) |
| *F16H 35/00* | (2006.01) |

(52) U.S. Cl.
CPC ......... *F16H 55/30* (2013.01); *F16H 57/0006* (2013.01); *F16H 2035/003* (2013.01); *F16H 2057/0012* (2013.01); *Y02T 50/823* (2013.01)

(58) Field of Classification Search
USPC .......................................................... 244/50
See application file for complete search history.

(56) References Cited

U.S. PATENT DOCUMENTS

| | | |
|---|---|---|
| 2011/0303785 A1 | 12/2011 | Delloue et al. |
| 2012/0153075 A1 | 6/2012 | Wilson et al. |
| 2012/0217339 A1 | 8/2012 | Gilleran et al. |
| 2012/0291576 A1 | 11/2012 | Geiser |
| 2012/0312112 A1 | 12/2012 | Tizac |
| 2013/0095974 A1 | 4/2013 | Imai et al. |
| 2013/0233969 A1 | 9/2013 | Charles et al. |
| 2014/0225421 A1 | 8/2014 | Oswald et al. |
| 2014/0245853 A1 | 9/2014 | Didey |
| 2015/0210385 A1 | 7/2015 | Didey |
| 2016/0039519 A1 | 2/2016 | Didey |
| 2016/0200426 A1 | 7/2016 | Didey |
| 2016/0221669 A1 | 8/2016 | Didey |
| 2017/0050725 A1 | 2/2017 | Wilson |

FOREIGN PATENT DOCUMENTS

| | | |
|---|---|---|
| WO | 0146605 | 6/2001 |
| WO | 2011023505 | 3/2011 |
| WO | 2012171589 | 12/2012 |
| WO | 2014023939 | 2/2014 |
| WO | 2014023941 | 2/2014 |

OTHER PUBLICATIONS

Hiroshi Honda, "Research on the Trochoidal Gears (2nd Report): Pressure Angle of Trochoidal Gears and Modification of Tooth Profile", Translation of Journal of the Japan Society for Precision Engineering, 1995, vol. 61, No. 2, p. 208-212.
International Search Report and Written Opinion of the ISA dated May 6, 2015 International Application No. PCT/GB2015/050413.

DRIVE SYSTEM FOR AIRCRAFT LANDING GEAR

CROSS RELATED APPLICATIONS

This application is a Continuation of U.S. patent application Ser. No. 15/118,791, filed Aug. 12, 2016, now allowed, which is the U.S. National Phase of International Application No. PCT/GB2015/050413, filed Feb. 13, 2015, and claims priority from Great Britain Patent Application No. 1402518.3, filed Feb. 13, 2014 and Great Britain Patent Application No. 1402501.9, filed Feb. 13, 2014, the entire contents of each of which are hereby incorporated by reference.

FIELD OF THE INVENTION

The present invention relates to a drive system for rotating one or more wheels of an aircraft landing gear for the purposes of ground taxiing and/or spin-up prior to landing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

SUMMARY OF THE INVENTION

A first aspect of the invention provides a drive system for rotating a wheel of an aircraft landing gear, the drive system including: a motor operable to rotate a drive pinion via a drive path; and a driven gear adapted to be attached to the wheel so as to be capable of rotating the wheel, wherein: the drive system has a drive configuration in which the drive pinion is capable of meshing with the driven gear to permit the motor to drive the driven gear via the drive path; one of the drive pinion and the driven gear comprises a roller gear having a series of rollers arranged to form a ring, each roller being rotatable about a roller axis, and the other of the drive pinion and the driven gear comprises a sprocket; the drive path comprises a first compensating gear and a second compensating gear which meshes with the first compensating gear; and the drive system is configured such that, when the motor drives the driven gear via the drive path in the drive configuration, there is a first oscillation in torque transmitted from the drive pinion to the driven gear and a second oscillation in torque transmitted from the second compensating gear to the drive pinion via the first compensating gear and the common drive shaft, the second oscillation tending to counteract the first oscillation.

The phase of the second oscillation is arranged so that it tends to counteract the first oscillation, for instance the second oscillation may have a maximum which coincides with a minimum in the first oscillation, or vice versa. Typically the first and second oscillations are each periodic, and a period of the first oscillation is an integer multiple of a period of the second oscillation.

The compensating gears may be any form of gear arrangement which results in a torque oscillation. For instance the second compensating gear may have teeth which mesh with teeth of the first compensating gear; and the first and second compensating gears are non-circular gears each having teeth arranged around its circumference to form a non-circular shape.

As another example, one of the first and second compensating gears may be circular with a non-concentric rotation axis, and the other of the first and second compensation gears may be a non-circular gear. Alternatively, both of the compensation gears may be circular with non-concentric rotation axes.

The compensation gears may be part of any suitable gear arrangement, such as a parallel axis, torque split or epicycloid gear arrangement.

A second aspect of the invention provides a drive system for rotating a wheel of an aircraft landing gear, the drive system including: a motor operable to rotate a drive pinion via a drive path; and a driven gear adapted to be attached to the wheel so as to be capable of rotating the wheel, wherein: the drive system has a drive configuration in which the drive pinion is capable of meshing with the driven gear to permit the motor to drive the driven gear via the drive path; one of the drive pinion and the driven gear comprises a roller gear having a series of rollers arranged its circumference to form a circular ring, each roller being rotatable about a roller axis, and the other of the drive pinion and the driven gear comprises a sprocket; the drive path comprises a first compensating gear mounted on a common drive shaft with the drive pinion so as to be capable of rotating in tandem with the drive pinion, and a second compensating gear with teeth which mesh with teeth of the first compensating gear; and the first and second compensating gears are non-circular gears each having teeth arranged around its circumference to form a non-circular shape.

By providing the drive pinion and driven gear as a roller gear and sprocket (or sprocket and roller gear), several advantages are achieved over a conventional toothed gear arrangement. In particular, the roller gear and sprocket may be especially tolerant of distortion of the landing gear wheel during use, and misalignment between the drive pinion and driven gear caused by bending of the wheel axle. However, the inventor has identified that a problem with a sprocket-roller gear arrangement is that a variation in roller gear rotational speed occurs with each tooth to roller engagement and disengagement. That is, the torque transfer from the drive pinion to the driven gear is not smooth, but is instead subject to cyclical variations. This torque/velocity variation, or transmission error, may lead to undesirable vibration within the landing gear during operation of the drive system.

The present invention provides a solution in the form of the drive path. Thus, vibrations caused by fluctuations in the transfer of torque between the drive pinion and the driven gear can be isolated within the common drive shaft, and prevented from being transmitted through the drive train to the landing gear by compensating torque fluctuations between the first and second compensating gears.

The term roller gear is used to denote a gear formed from a plurality of rotatable rollers arranged to form a (circular) ring. Each roller is typically rotatable about a pin, which is typically fixed at at least one end to an annular ring member. Such a gear may alternatively be referred to as a pin gear.

The non-circular shapes may be oval or other curved non-circular shapes. But, more preferably they are first and second polygons, each polygon having a plurality of sides of equal length, the first and second polygons having the same number of sides, and the length of the sides of the first polygon being the same as the length of the sides of the second polygon. Such a gear arrangement provides a periodic oscillation in torque, with N cycles per revolution of the compensating gears where N is the number of sides of the polygon. Preferably the number of sides of the polygon is twice the number of rollers or teeth in the drive pinion—in other words the drive pinion has M rollers or teeth, and N is equal to 2M. However, N being other integer multiples of M is also possible.

Typically each side of the polygon comprises one, preferably two, or more teeth. The first and second polygons, typically, have the same number of teeth per side.

The polygons may have straight, or substantially straight, sides. Alternatively, the sides may be curved (for example, like for a Reuleaux polygon).

An average diameter of the first compensating gear is typically equal to an average diameter of the second compensating gear.

Typically each tooth of each compensating gear is spaced apart from a geometrical centre of its respective compensating gear by a radial distance, and the radial distances of the teeth vary (typically in a periodic manner) around a circumference of the respective compensating gear.

Typically each compensating gear has rotational symmetry of order four or more, preferably six or more, most preferably ten or more.

The drive system may be fixed permanently in the drive configuration, or it may be switchable between the drive configuration and a second configuration in which the drive pinion is not capable of meshing with the driven gear.

Preferably, the first compensating gear is mounted on a common drive shaft with the drive pinion so as to be capable of rotating in tandem with the drive pinion.

The compensation gears may be part of any suitable gear arrangement, such as a parallel axis, torque split or epicycloid gear arrangement.

A third aspect of the invention provides an aircraft landing gear comprising a wheel and a drive system according to the first or second aspect, wherein the driven gear of the drive system is attached to the wheel so as to be capable of rotating the wheel.

A fourth aspect of the invention provides a method of rotating a wheel of an aircraft landing gear with the drive system of the first or second aspect, the method comprising: operating the motor to drive the driven gear via the drive path; transmitting torque from the drive pinion to the driven gear, wherein there is a first oscillation in the torque transmitted from the drive pinion to the driven gear; and transmitting torque from the second compensating gear to the drive pinion via the first compensating gear and the common drive shaft, wherein the first and second compensating gears introduce a second oscillation in the torque transmitted from the second compensating gear to the drive pinion which tends to counteract the first oscillation.

All of the optional, or desirable, features of the invention described herein may be applied to any aspect of the invention, either alone or in any combination.

BRIEF DESCRIPTION OF THE DRAWINGS

Embodiments of the invention will now be described with reference to the accompanying drawings, in which.

DETAILED DESCRIPTION OF EMBODIMENT(S)

The illustrated embodiments are shown applied to an aircraft landing gear which has two wheels, but the principles of the embodiments may be applied to landing gear with any number of wheels including only a single wheel. The embodiments are applied to a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

Figure 1:
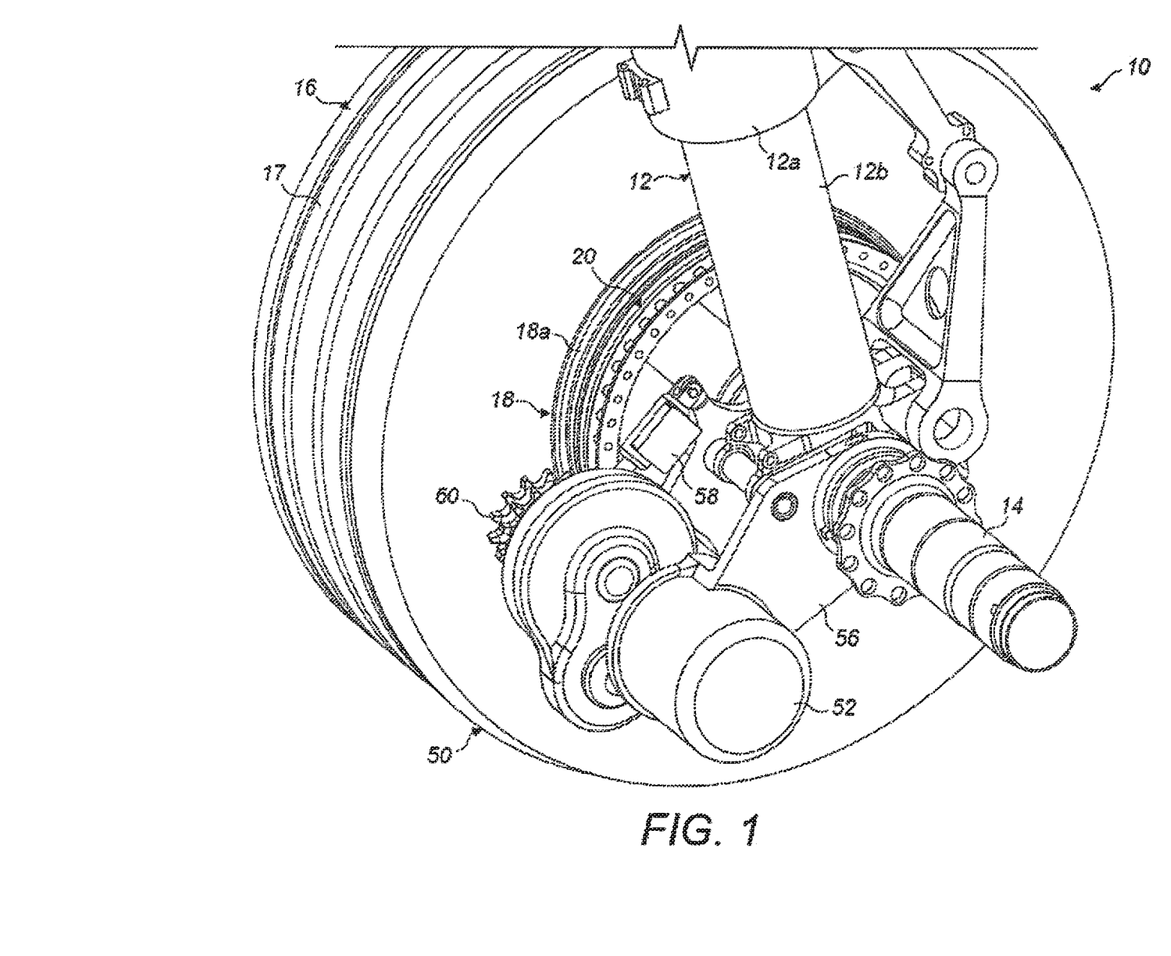
FIG. 1 shows an isometric view of a drive system according to a first embodiment.
Figure 2:
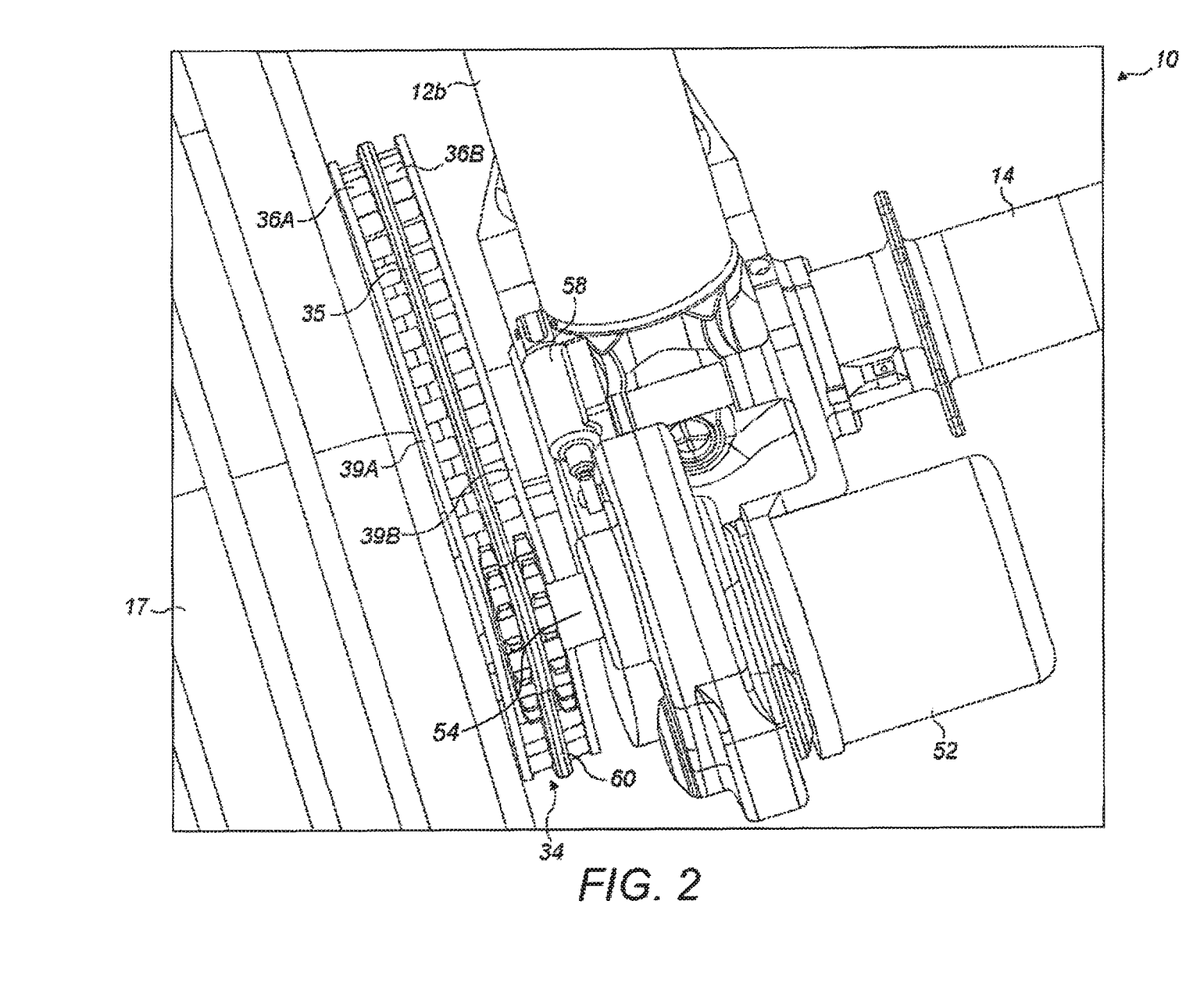
FIG. 2 shows a further isometric view of the drive system of FIG. 1.

The landing gear 10 includes a telescopic shock absorbing main leg 12, including an upper telescopic part 12a (main fitting) and a lower telescopic part 12b (the slider). The upper telescopic part 12a is attached to the aircraft fuselage or wing (not shown) by its upper end (not shown). The lower telescopic part 12b supports an axle 14 carrying a pair of wheels 16, one on either side of the main leg (only one wheel 16 is shown in FIGS. 1 and 2, for clarity). The wheels 16 are arranged to rotate about the axle 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16. The driven gear 20 may be attached to the wheel 16 by a plurality of discrete couplings, which may provide a rigid or flexible attachment. Alternatively, the attachment may be via a flange forming a continuous extension rim projecting axially from either the wheel 16 or the driven gear 20.

The drive system 50 includes a motor 52 which transmits torque to a drive shaft 54 via a gearbox 70. The drive system 50 is supported by a bracket 56 which is rigidly connected to the axle 14 of the landing gear. The bracket 56 includes two lugs comprising half moon clamps to permit ready attachment and detachment of the bracket 56 to the axle 14. The motor 52 is fixedly connected, e.g. by bolting, to the bracket 56. The gearbox 70 is pivotally connected to the bracket 56 at pivot lugs 80 on each arm of the bracket 56 disposed either side of the gearbox 70.

A drive pinion 60 is mounted on the drive shaft 54 so as to be rotatable by the drive shaft about a drive axis. The drive pinion 60, drive shaft 54 and gearbox 70 are pivotable by a linear actuator (positioner) 58, such as a direct drive roller screw electro mechanical linear actuator, extends between the bracket 56 (at an end nearest the axle 15) and the gearbox 70, or more particularly the housing 84 of the gearbox. Thus, linear movement of the actuator 58 is translated into rotational movement of the gearbox 70 and the drive pinion 60 about the pivot lugs 80. The drive system 50 can therefore be between a neutral configuration (not shown) in which the drive pinion 60 does not mesh with the driven gear 20, and a driven configuration (shown in FIGS. 1, 2 and 3) in which the drive pinion 60 is in meshed engagement with the driven gear In the neutral configuration the wheel 16 is able to rotate freely, e.g. during take-off and landing, while in the driven configuration the wheel 16 can be driven by the drive system 50, e.g. during ground taxiing.

In the embodiment of FIGS. 1 and 2 the driven gear 20 comprises a roller gear 34 and the drive pinion 60 comprises a sprocket.

The roller gear 34 is formed by a rigid annular ring 35 and a series of pins (not shown) projecting from both sides of the annular ring 35. A first series of rollers 36a rotatably supported by the pins is provided on one side of the annular ring 35, and a second series of rollers 36b rotatably supported by the pins as provided on the other side of the annular ring. Each series of rollers 36a, 36b extends around the annular ring to form a continuous track. First and second lateral annular rings 39a, 39b sandwich the first and second series of rollers 36a, 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins which are cantilevered off the central spine. The annular ring 35 comprises a plurality of axially extending connection extension tabs (not shown) providing mounting means for mounting the roller gear 34 to the hub 18. Alternatively, the tabs may be substituted for the annular ring 35.

The drive pinion 60 comprises a sprocket having two coaxial rings of radially extending sprocket teeth which can interlock with the rollers 36 of roller gear 34. That is, each ring of sprocket teeth is arranged to mesh with one of the rings of rollers of the driven gear 20.

Figure 3:
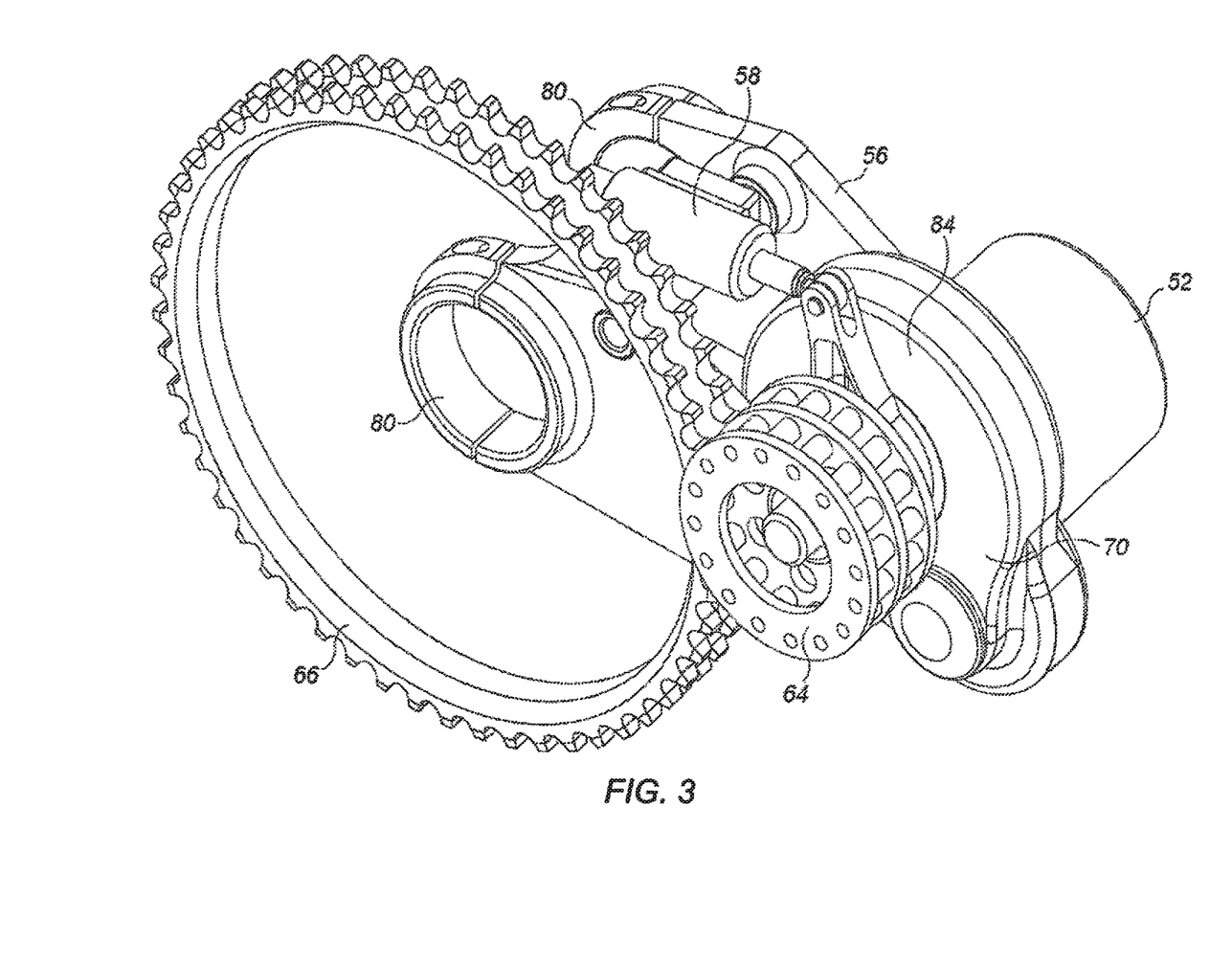
FIG. 3 shows an isometric view of selected components of a drive system according to a second embodiment.

FIG. 3 shows an alternative, and preferred, embodiment in which the driven gear 20 comprises a sprocket instead of a roller gear, and the drive pinion comprises a roller gear instead of a sprocket. Thus, the drive pinion comprises a roller gear 64 having two coaxial rings of rollers and the driven gear 20 is replaced by sprocket 66 having two coaxial rings of sprocket teeth. In all other respects the drive system is identical to that described above with reference to FIGS. 1 and 2, and the features of the drive system described below apply equally to both embodiments. The roller gear 64 may be constructed similarly to the roller gear 34, although of course it has a much smaller diameter and therefore fewer rollers.

An advantage of the sprocket-roller gear arrangement is that it is more tolerant of wheel and axle deformation than meshing toothed gear arrangements. Landing gear wheels and axles are subject to high loads and consequential deformation during ground taxiing, and a driven gear fixed to the wheel will inevitably deform in response to such deformation. Meshing toothed gears are intolerant of such deformation and a typical toothed rim gear may need to be isolated from the wheel via bearings, a flexible interface, or similar. In contrast, the sprocket and roller arrangement of the present invention may be able to tolerate the deformation without such modification.

Such an arrangement also has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

However, a problem with a sprocket-roller gear arrangement identified by the inventor is that a variation in roller gear velocity occurs with each tooth to roller engagement and disengagement. That is, the torque transfer from the drive pinion to the driven gear is not smooth, but is instead subject to cyclical variations. This torque/velocity variation may lead to undesirable vibration within the landing gear and aircraft wheel during operation of the drive system.

The delivered torque varies both as each roller moves along a tooth profile, and as each roller engages with or disengages from a tooth. This is illustrated in FIGS. 4 to 7, which show an example schematic torque profile and illustrate the roller-sprocket tooth dynamics at various significant parts of that profile. In FIGS. 4 to 7 the roller gear is the drive pinion and the sprocket is the driven gear (as in the embodiment of FIG. 3). The torque profile has a generally periodic or cyclical shape, with each phase (corresponding to the time between each sprocket-roller engagement) containing two maxima (labelled max1 and max2) and two minima (labelled min1 and min2). The skilled person will understand that the illustrated torque profile is merely an example, and that the torque profile, while always having a generally 'saw tooth' shape, may vary with the tooth pitch, the particular shape of the sprocket teeth, the size of the rollers, and many other variables.

As the skilled person will appreciate, the torque transfer between a roller and a sprocket tooth is dependent on the radial distance from the rotational centre of the driven gear at which the force is applied, and the direction in which that force is applied. That is, torque transfer is maximised when the contact point between the roller and sprocket tooth occurs at the largest radial distance from the driven gear (sprocket) centre, and when the force vector at that contact point is orthogonal to the local radius of the driven gear (i.e. tangential to the driven gear). The torque thus varies as these attributes vary.

Figure 4:
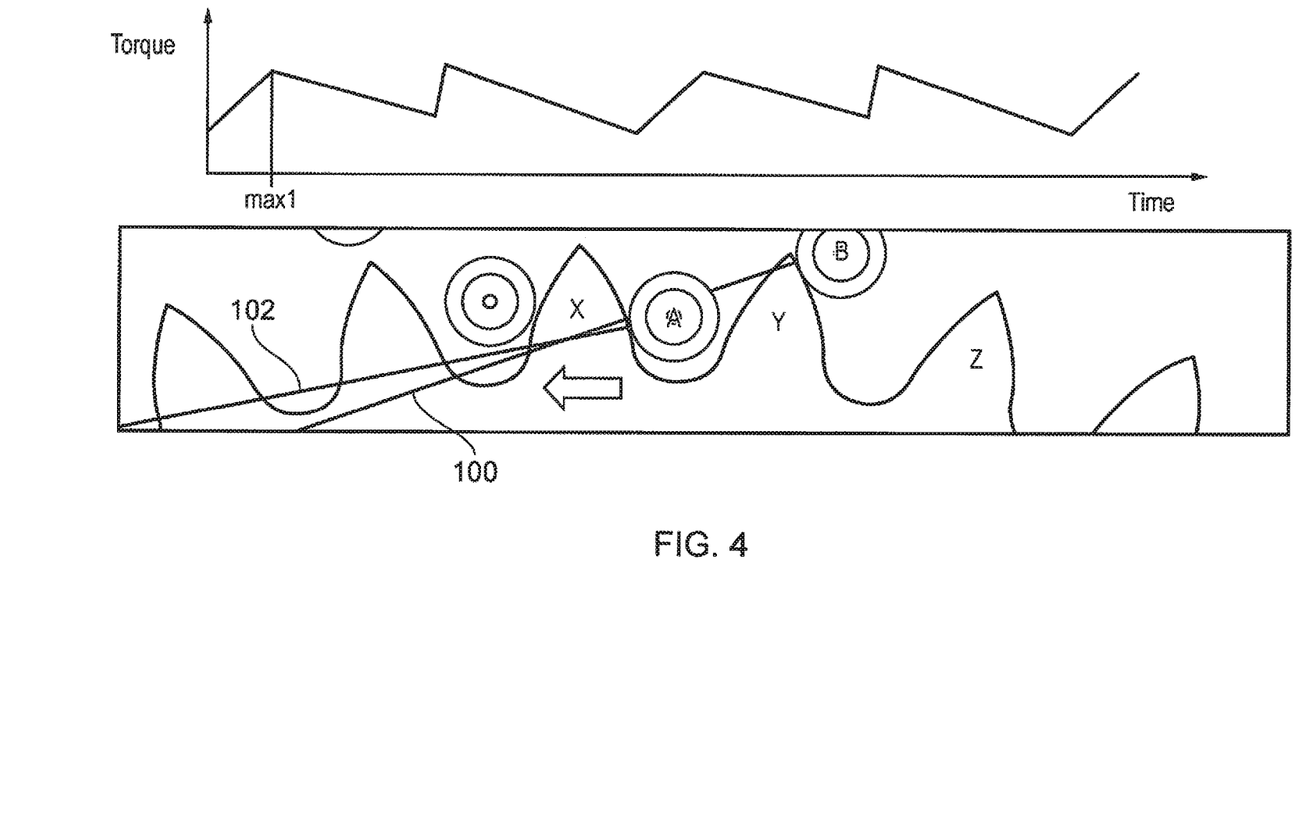
FIGS. 4 to 7 show schematic representations of the torque variations experienced at various stages of a roller gear roller/sprocket tooth engagement cycle.

FIG. 4 shows the relative positions of the rollers and sprocket teeth at the time corresponding to the maximum labelled max1. Here, two rollers A, B are engaged with two sprocket teeth Y, Z, respectively. Force vector 100 indicates the direction of force transfer between roller B and tooth Y, while force vector 102 indicates the direction of force transfer between roller A and tooth X. It can be seen from force vector 100 that roller B is close to its maximum radial distance from the driven gear centre, but has a force vector angle which is substantially lower than 90 degrees to the local radius of the driven gear. Force vector 102 shows that roller A is approaching a minimum radial distance, but has a force vector angle which is near to 90 degrees. The sum of these force vectors 100, 102 provides a torque maximum, max1.

Figure 5:
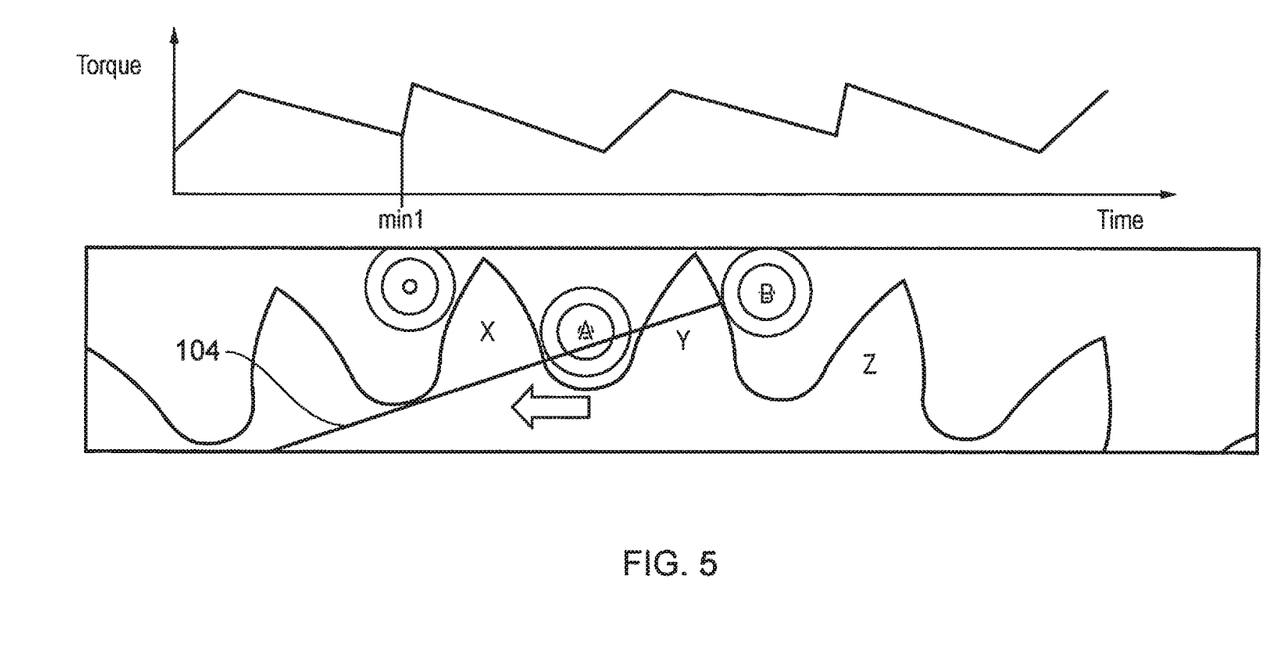

FIG. 5 shows the relative positions of the rollers and sprocket teeth at the torque minimum, min1. Between max1 and min1 roller A has disengaged from tooth X and roller B has maintained engagement with tooth Y but has moved along the tooth profile. Force vector 104 indicates that roller B has moved closer to the driven gear centre, with little change in its force vector angle. As a result of these changes, the torque has decreased to a minimum, min1.

Figure 6:
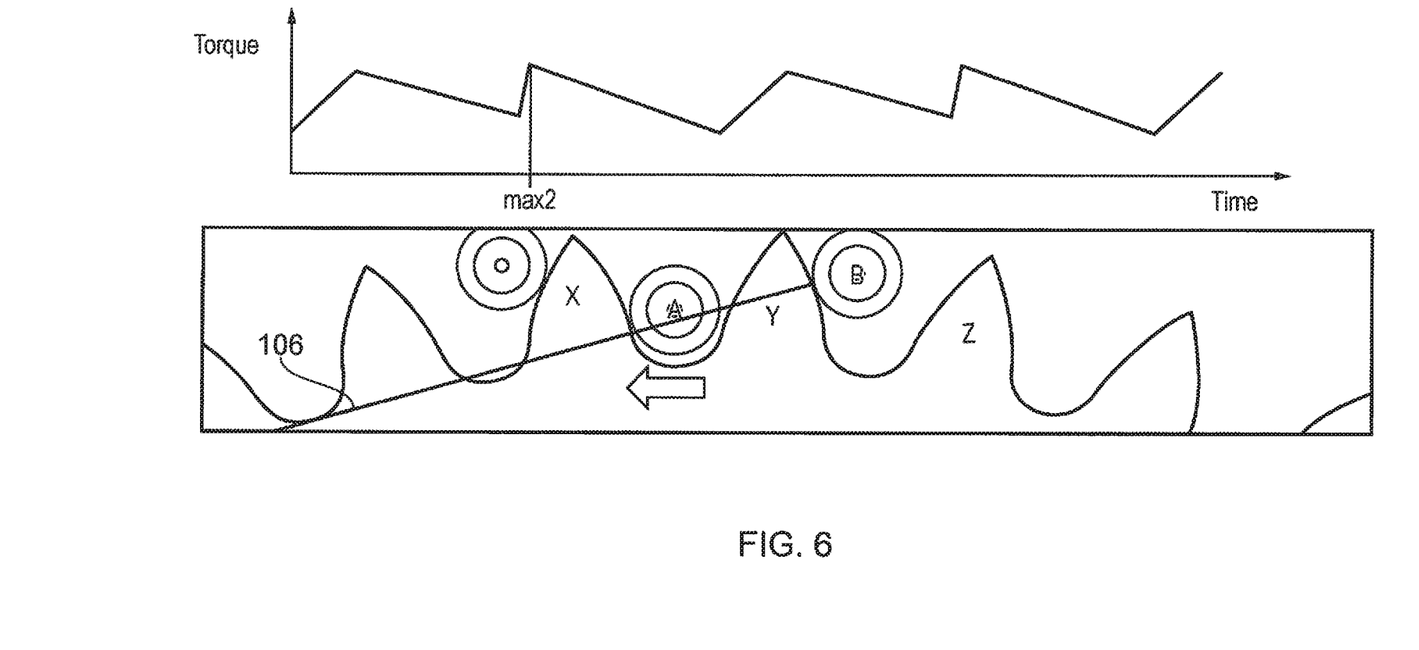

FIG. 6 shows the relative positions of the rollers and sprocket teeth at the second torque maximum, max2. Between min1 and max2 roller B has moved further along the tooth profile of tooth Y. Force vector 106 shows that, although roller B has moved closer to the driven gear centre, its force vector angle has increased to nearer 90 degrees because of a change in the tooth profile shape. These changes have resulted in a torque increase from min1 to max2.

Figure 7:
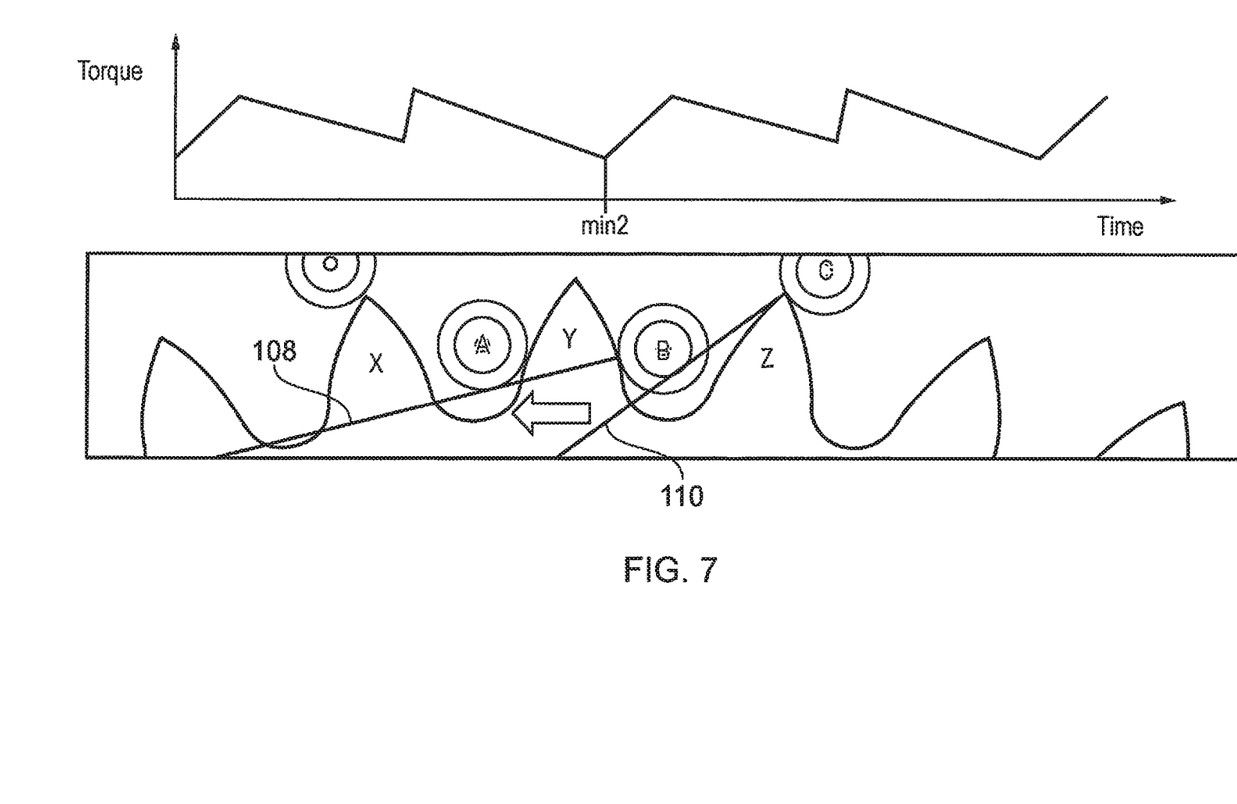

FIG. 7 shows the relative positions of the rollers and sprocket teeth at the second torque minimum, min2. Between max2 and min2 roller B has moved still further along the tooth profile of tooth Y, force vector 108 showing that roller B has moved closer to the driven gear centre but with little change to its force vector angle, resulting in a decrease in transferred torque. Roller C has moved into engagement with tooth Z, force vector 110 showing that its transferred torque is initially low despite its high distance from the driven gear centre, since its force vector angle is substantially lower than 90 degrees.

The fluctuations in torque transfer between the drive pinion and driven gear illustrated in FIGS. 4 to 7 are undesirable in a drive system according to embodiments of the invention because they result in undesirable vibration within the landing gear and drive system during operation of the drive system, as discussed above. The gearbox 70 of the invention provides a simple passive mechanical means for cancelling out, at least in part, such torque fluctuations.

Figure 8:
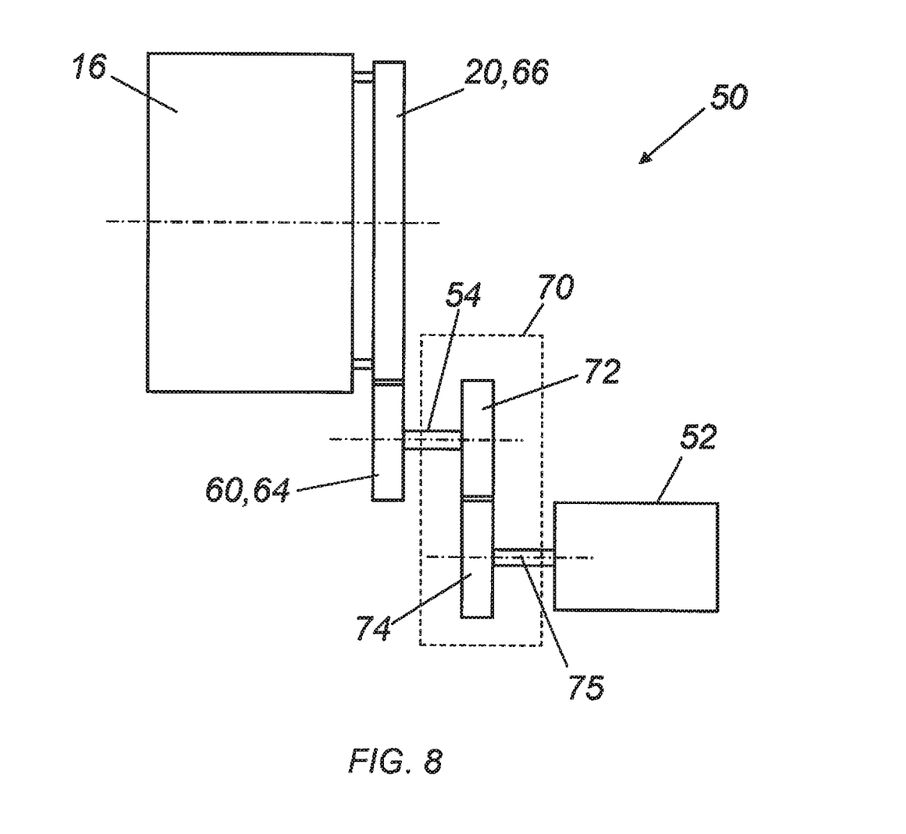
FIG. 8 shows a schematic representation of a drive system according to an embodiment of the present invention.
Figure 9A:
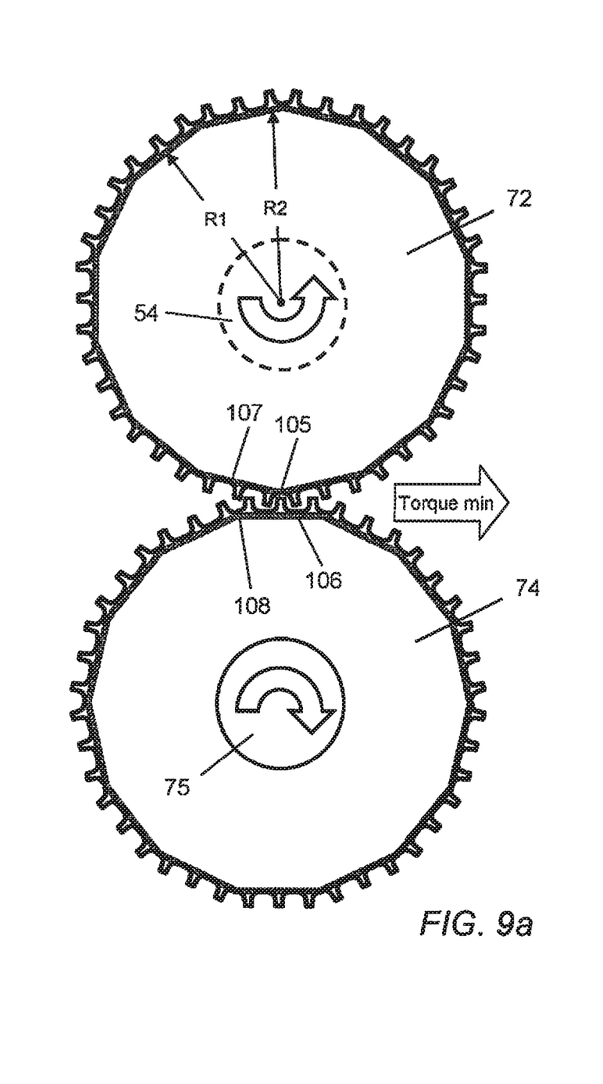
FIG. 9a shows the first and second compensating gears in a position of torque minimum.

FIGS. 8 and 9a illustrate an embodiment of the gearbox 70 suitable for providing a drive path between the motor 52 and drive pinion 64 of a drive system 50, such as that shown in FIG. 3, in which the drive pinion comprises a roller gear and the driven gear comprises a sprocket.

The gearbox 70 includes a first polygonal compensating gear 72, which is mounted on the drive shaft 54 and thus rotates in tandem with the drive pinion 64. The gearbox 70 also includes a second polygonal compensating gear 74 which is driven by an output shaft 75 of the motor 52 and meshes with the first compensating gear 72. The compensating gears 72, 74 are identical idler gears which do not have any influence on the overall gear ratio of the gearbox 70. The gearbox 70 may include further gears, such as toothed spur gears, in order to provide a desired gearing ratio.

FIG. 9a shows the compensating gears 72, 74 viewed from the right-hand side of FIG. 8. The teeth of the first and second compensating gears are arranged with equivalent points on the teeth (for instance their geometrical centres) forming respective closed non-circular shapes. In the illustrated example each closed non-circular shapes is a fourteen-sided polygon with straight sides of equal length, each side of the polygon carrying three teeth. Each tooth is spaced apart from a geometrical centre of the gear (which is also its axis of rotation) by a radial distance. The radial distances of the teeth vary around the circumference of the gear: in this case, for each set of three teeth the radial distance R1 of the central tooth is smaller than the radial distance R2 of the teeth on either side. It will be appreciated that the number of sides and the number of teeth per side may vary from that shown in FIGS. 8 and 9a. In the case where the drive pinion roller gear 64 has sixteen teeth as shown in FIG. 3, then the preferred number of sides of each polygon is thirty two. This is not shown in FIG. 9a merely to improve the clarity of the drawing. The gear has a high degree of rotational symmetry—in this case it has rotational symmetry of order fourteen.

Figure 9B:
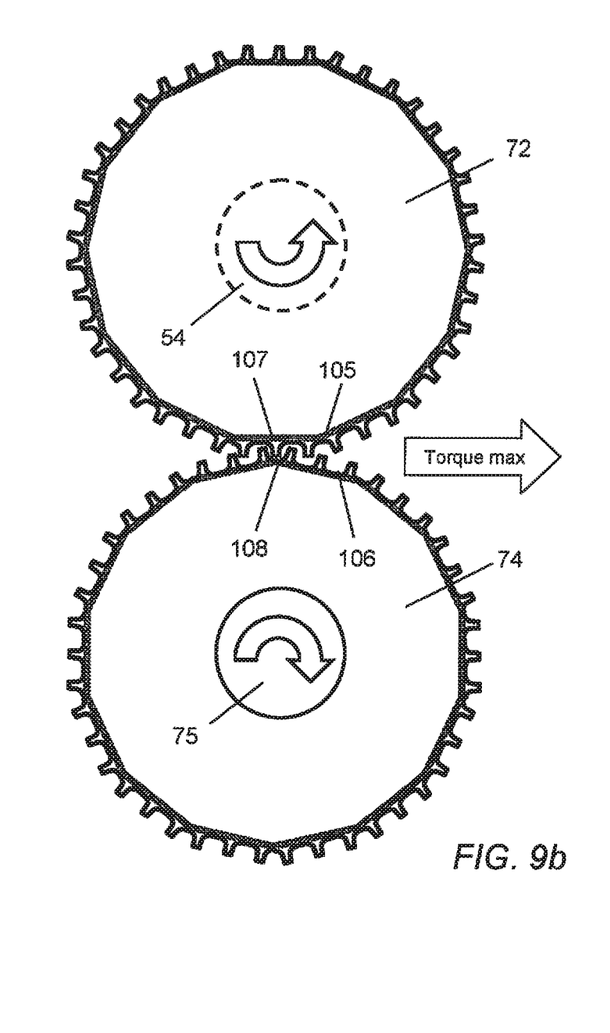
FIG. 9b shows the first and second compensating gears in a position of torque maximum.

In the position of FIG. 9a, the gears are meshing at a corner 105 of the first (driven) compensating gear 72 and a side 106 of the second (driving) compensating gear 74. The torque transmitted between the gears is a function of the radius of the meshing point from the axes of rotation of the gears. In the position of FIG. 9a the radius is at a maximum for the first gear 72 and a minimum for the second gear 74, so the torque transmission is at a minimum. As the gears rotate to the position of FIG. 9b, the gears are now meshing at a side 107 of the first (driven) compensating gear 72 and a corner 108 of the second (driving) compensating gear 74. In the position of FIG. 9b the radius is at a minimum for the first gear 72 and a maximum for the second gear 74, so the torque transmission is at a maximum. This causes a second oscillation or ripple in the torque transmitted from the second compensating gear 74 to the drive pinion 64 via the first compensating gear 72 and the common drive shaft 54, based on a constant speed and torque input from the drive shaft 75 of the motor.

Figure 10A:
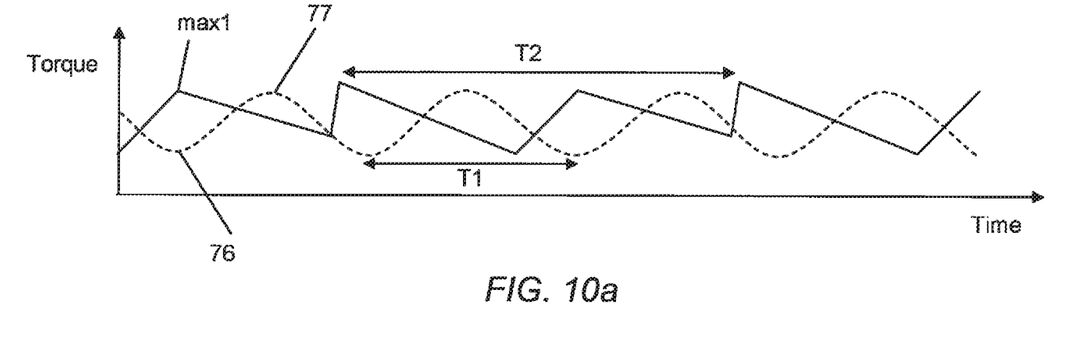
FIG. 10a shows a schematic representation of the torque variations resulting from the drive pinion/driven gear engagement (solid line) and the first and second compensating gear engagement (broken line) in a drive system according to an embodiment of the invention.

The phase of this second oscillation is set so that it tends to counteract the first oscillation described above in FIGS. 4-7, as shown in FIG. 10a. The torque variation caused by the meshing engagement between the drive pinion 64 and driven gear 66 is indicated by a solid line (the profile being identical to that previously described in relation to FIGS. 4 to 7), while the torque variation caused by the meshing engagement between the first 72 and second 74 compensating gears is indicated by a broken line.

The torque profile of the compensating gears (broken line) is approximately sinusoidal with a period T1 which is half the period T2 of the first oscillation (due to the fact that there are twice as many sides in the polygon as there are rollers in the drive pinion 64). The phase of the second oscillation (broken line) is chosen so that, as far as is possible, the maxima of one oscillation coincide with the minima of the other oscillation. In the example of FIG. 10a the phase of the second oscillation is chosen so that each max1 in the first oscillation is timed to coincide with a minimum 76 in the second oscillation. Other arrangements are possible—for instance each min1 in the first oscillation may coincide with a maximum 77 in the second oscillation.

The summed result (not shown) is on average a smoother, less fluctuating, torque delivery. Thus, vibrations caused by fluctuations in the transfer of torque between the drive pinion and the driven gear are experienced only within the drive shaft 54, and are prevented from being transmitted through the drive train to the landing gear by the compensating torque fluctuations between the first 72 and second 74 compensating gears.

Figure 10B:
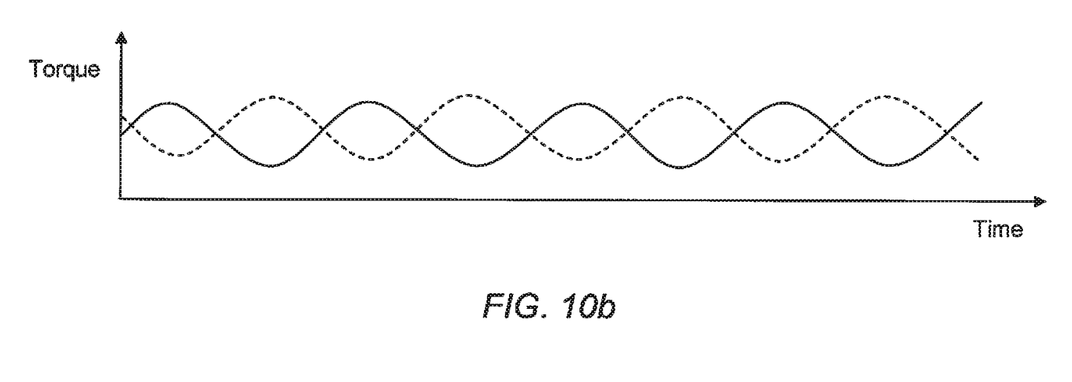
FIG. 10b shows a schematic representation of the torque variations resulting from the drive pinion/driven gear engagement (solid line) and the first and second compensating gear engagement (broken line) in a drive system according to an alternative embodiment of the invention.

Optionally the profile of the teeth of the drive pinion may be changed from the profile shown in FIGS. 4-7 so the first oscillation is closer to a sine wave and hence matched more closely with the second oscillation. An example of this is shown in FIG. 10b in which, as in FIG. 10a, the first oscillation (between the drive pinion 64 and driven gear 66) is indicated in solid line and the second oscillation (between the compensating gears 72, 74) is indicated in broken line. In this example the two wave-forms are identical and in anti-phase, resulting in a summed result (not shown) which is smoother than the summed result (not shown) for FIG. 10a.

The description of the gearbox 70 above relates to the illustrated embodiment of FIG. 8 which is suitable for use in the drive system of FIG. 3, but it will be understood that the invention extends to an alternative embodiment suitable for use in the drive system of FIGS. 1 and 2.

Figure 11:
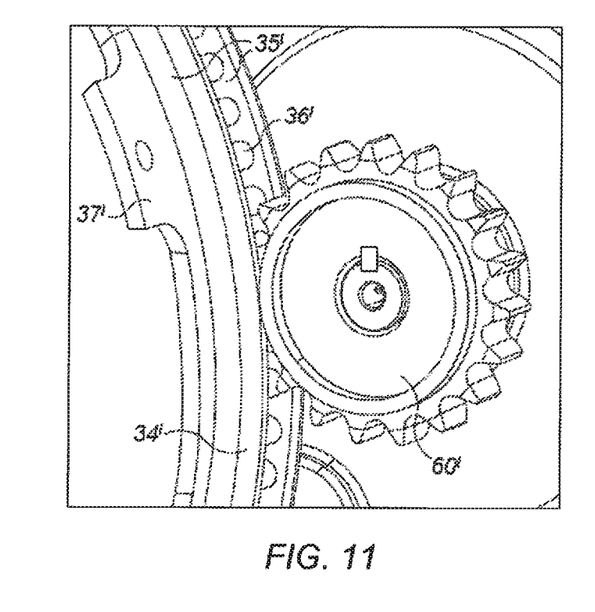
FIG. 11 shows an isometric detail view of selected components of the drive system of FIG. 1 with an alternative drive pinion and driven gear.
Figure 12:
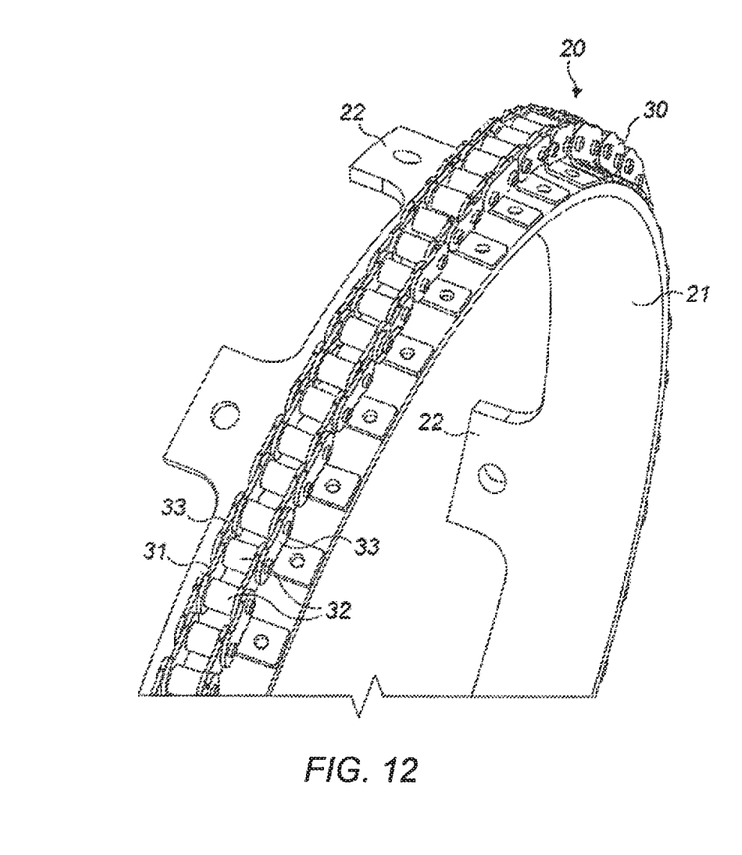
FIG. 12 shows an isometric view of an alternative driven gear of the drive system of FIG. 11.

In variations to the embodiments described above, the drive pinion may be formed as a sprocket 60' (see FIG. 11) having a single row of teeth, and the driven gear may be formed as a roller gear having a single row of rollers. The roller gear may take many forms, including the roller gear 34' of FIG. 11 and the roller chain gear 20 variant of FIG. 12. In the roller chain gear 20 of FIG. 12 a roller chain 30 extends around a rigid annular extension ring 21. The roller chain 30 is driven by a single sprocket (not shown) similar to the sprocket 60'. The extension ring 21 (or drum) is rigidly attached to the hub 18 via a plurality of extension tabs 22 so that it extends from an outer circumference of the hub 18 towards the leg 12. A roller chain 30 is fixed around the outer circumference of the extension ring 21 so that it forms a continuous track around the ring 21. The roller chain 30 comprises multiple interlinked chain elements 31, each comprising a sub-assembly of two rollers 32 mounted on parallel axes. Each roller 32 is rotatable about a bush (not shown) which is itself mounted on a pin (not shown). Each chain element 31 is pivotally mounted to its neighbouring element by a pair of link elements 33 so that the rollers 32 are arranged to form a continuous track, or series, and each element 31 is thus designed to be able to rotate relative to its neighbour. Of course, since the roller chain 30 is fixed to the extension ring 21, the chain elements 31 are prevented from pivoting relative to one another. The driven gear may include a plurality of multiple coaxial chains engagable by a pinion formed by multiple coaxial sprockets.

Figure 13:
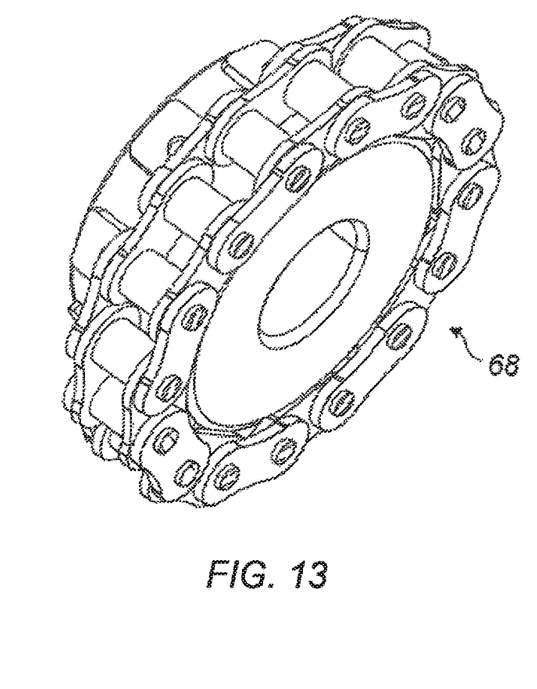
FIGS. 13 and 14 show isometric views of alternative drive pinions.
Figure 14:
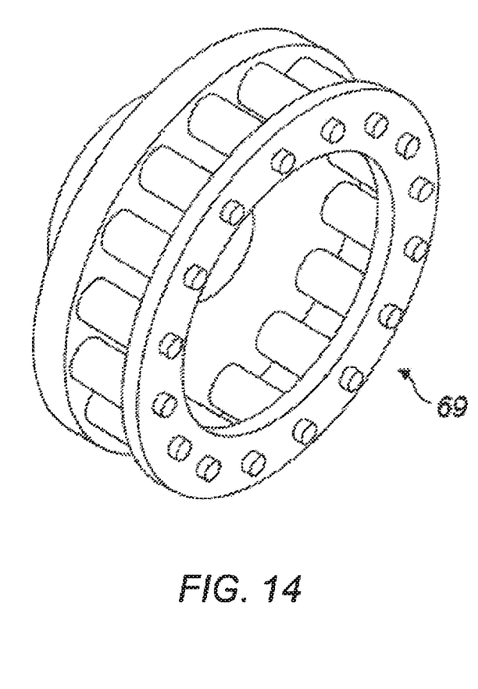

In a further variation, illustrated in FIGS. 13 and 14, the drive pinion may alternatively comprise a single ring of rollers for engaging with a driven gear formed as a sprocket (not shown) having a single row of sprocket teeth. The roller gear may take many forms, including a typical roller gear such as roller gear 69 in FIG. 13, or a roller chain gear 68 such as that shown in FIG. 14.

The embodiments described above are suitable only for ground taxiing operations but could be modified (e.g. by adjustment of the gearbox ratio) to be suitable for only pre-landing spin-up operations. In the taxiing configuration the linear actuator 58 (which may be back drivable) may be torque controlled (or current controlled) to apply a substantially constant load between the sprockets 60 and the driven gear 20, thereby allowing for some deformation of the various component parts of the drive system 50 while at the same time preventing unwanted separation. An electro mechanical brake (not shown), or other similar blocking device, may be integrated within the actuator 58 to lock the actuator in the disengaged (second) configuration.

In each of the arrangements described above the principle of achieving drive via meshing between a sprocket and roller gear/roller chain can be applied when the driven gear comprises the sprocket and the drive pinion comprises the roller gear/roller chain, and vice versa.

Although the figures only show features of the drive system 50 for driving one of the wheels 16, it is envisaged that these features may be mirrored for the other wheel 16. That is, it is envisaged that one drive system 50 may be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft of the gearbox 70 of each drive system.

Although the figures only show the drive system 50 supported by a bracket 56 which is rigidly connected to the axle 14 of the landing gear, the drive system 50 may alternatively be mounted on the upper telescopic part 12a (main fitting) or lower telescopic part 12b (slider).

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including:
    a motor operable to rotate a drive pinion via a drive path; and
    a driven gear adapted to be attached to the wheel so as to be capable of rotating the wheel,
    wherein:
    the drive system has a drive configuration in which the drive pinion is capable of meshing with the driven gear to permit the motor to drive the driven gear via the drive path;
    one of the drive pinion and the driven gear comprises a roller gear having a series of rollers arranged to form a ring, each roller being rotatable about a roller axis, and the other of the drive pinion and the driven gear comprises a sprocket;
    the drive path comprises a first compensating gear and a second compensating gear which meshes with the first compensating gear; and
    the drive system is configured such that, when the motor drives the driven gear via the drive path in the drive configuration, there is a first oscillation in torque transmitted from the drive pinion to the driven gear and a second oscillation in torque transmitted from the second compensating gear to the drive pinion via the first compensating gear and the common drive shaft, the second oscillation tending to counteract the first oscillation.

2. A drive system according to claim 1, wherein the drive system is configured such that the second oscillation has a maximum which coincides with a minimum in the first oscillation, or vice versa.

3. A drive system according to claim 1, wherein the first and second oscillations are each periodic, and a period of the first oscillation is an integer multiple of a period of the second oscillation.

4. A drive system according to claim 1, wherein the second compensating gear has teeth which mesh with teeth of the first compensating gear; and the first and second compensating gears are non-circular gears each having teeth arranged around its circumference to form a non-circular shape.

5. A drive system for rotating a wheel of an aircraft landing gear, the drive system including:
- a motor operable to rotate a drive pinion via a drive path; and
- a driven gear adapted to be attached to the wheel so as to be capable of rotating the wheel, wherein:
- the drive system has a drive configuration in which the drive pinion is capable of meshing with the driven gear to permit the motor to drive the driven gear via the drive path;
- one of the drive pinion and the driven gear comprises a roller gear having a series of rollers arranged to form a circular ring, each roller being rotatable about a roller axis, and the other of the drive pinion and the driven gear comprises a sprocket;
- the drive path comprises a first compensating gear and a second compensating gear with teeth which mesh with teeth of the first compensating gear; and
- the first and second compensating gears are non-circular gears each having teeth arranged around its circumference to form a non-circular shape.

6. A drive system according to claim 4, wherein each tooth of each compensating gear is spaced apart from a geometrical centre of its respective compensating gear by a radial distance, and the radial distances of the teeth vary around the circumferences of the compensating gears.

7. A drive system according to claim 4, wherein each tooth of each compensating gear has rotational symmetry of order four or more.

8. A drive system according to claim 4, wherein the non-circular shapes are first and second polygons, each polygon having a plurality of straight sides of equal length, the first and second polygons having the same number of straight sides, and the length of the sides of the first polygon are the same as the length of the sides of the second polygon.

9. A drive system according to claim 8, wherein each polygon has N straight sides of equal length, the drive pinion has M rollers or teeth, and N is equal to an integer multiple of M.

10. A drive system according to claim 8, wherein each straight side of the polygon comprises one or more teeth.

11. A drive system according to claim 1, wherein a pitch between rollers or teeth, respectively, of the drive pinion and driven gear is substantially equal to a pitch between teeth of the first compensating gear and the second compensating gear.

12. A drive system according to claim 1, wherein an average diameter of the first compensating gear is equal to an average diameter of the second compensating gear.

13. A drive system according to claim 1, wherein each of the series of rollers is rotatable about a pin, the pins each being fixed at at least one end to an annular support member.

14. A drive system according to claim 1, wherein the drive pinion is the roller gear and the driven gear is the sprocket.

15. A drive system according to claim 1, wherein the drive system is switchable between the drive configuration and a second configuration in which the drive pinion is not capable of meshing with the driven gear.

16. A drive system according to claim 1, wherein the first compensating gear is mounted on a common drive shaft with the drive pinion so as to be capable of rotating in tandem with the drive pinion.

17. An aircraft landing gear comprising a wheel and a drive system according to claim 1, wherein the driven gear of the drive system is attached to the wheel so as to be capable of rotating the wheel.

18. A method of rotating a wheel of an aircraft landing gear with the drive system of claim 1, the method comprising:
- operating the motor to drive the driven gear via the drive path;
- transmitting torque from the drive pinion to the driven gear, wherein there is a first oscillation in the torque transmitted from the drive pinion to the driven gear; and
- transmitting torque from the second compensating gear to the drive pinion via
- the first compensating gear and the common drive shaft, wherein the first and second compensating gears introduce a second oscillation in the torque transmitted from the second compensating gear to the drive pinion which tends to counteract the first oscillation.

* * * * *